(12) United States Patent
Gaston et al.

(10) Patent No.: US 7,905,200 B1
(45) Date of Patent: Mar. 15, 2011

(54) ICE DISPENSING APPARATUS FOR ANIMALS

(76) Inventors: Heidi M. Gaston, Bellaire, TX (US); Thomas M Ohman, Sugar Land, TX (US); Jean-Michel Gaston, Bellaire, TX (US)

( * ) Notice: Subject to any disclaimer, the term of this patent is extended or adjusted under 35 U.S.C. 154(b) by 156 days.

(21) Appl. No.: 11/584,406

(22) Filed: Oct. 20, 2006

(51) Int. Cl.
*A01K 5/02* (2006.01)
(52) U.S. Cl. .................................. 119/51.11; 119/52.1
(58) Field of Classification Search ............... 119/51.01, 119/51.02, 21.11, 52.1, 5.11; 62/340
See application file for complete search history.

(56) References Cited

U.S. PATENT DOCUMENTS

| | | | |
|---|---|---|---|
| 2,986,897 A | 6/1961 | Howard | |
| 3,131,551 A | 5/1964 | Ross | |
| 3,150,798 A | 9/1964 | Sutton | |
| 3,226,944 A | 1/1966 | Connors | |
| 3,577,957 A | 5/1971 | Sandig | |
| 3,985,104 A | 10/1976 | Klemer | |
| 4,823,738 A * | 4/1989 | Gold | 119/51.01 |
| 4,942,979 A | 7/1990 | Linstromberg et al. | |
| 4,964,535 A | 10/1990 | Curwen | |
| 5,404,838 A * | 4/1995 | Khan | 119/52.1 |
| 5,618,463 A | 4/1997 | Rindler et al. | |
| 5,921,103 A | 7/1999 | Hilsinger | |
| 6,283,063 B1 | 9/2001 | Zalevsky | |
| 6,349,671 B1 * | 2/2002 | Lewis et al. | 119/51.02 |
| 6,988,464 B1 * | 1/2006 | Rutledge | 119/51.01 |
| 7,111,581 B2 * | 9/2006 | Kubala et al. | 119/53.5 |
| 7,228,816 B2 * | 6/2007 | Turner et al. | 119/51.02 |
| 7,270,080 B1 * | 9/2007 | Kane | 119/51.01 |
| 2009/0056640 A1 * | 3/2009 | Gross | 119/702 |
| 2009/0145142 A1 * | 6/2009 | Lanzani | 62/137 |
| 2010/0155415 A1 * | 6/2010 | Ashrafzadeh et al. | 222/1 |

FOREIGN PATENT DOCUMENTS

DE    202005011646    * 2/2006

* cited by examiner

*Primary Examiner* — Rob Swiatek
*Assistant Examiner* — Kristen C Hayes
(74) *Attorney, Agent, or Firm* — Berggren Law Offices, LLC; William R. Berggren

(57) ABSTRACT

An apparatus to dispense ice to pets left alone by owners for a period of time. The apparatus includes an ice compartment, a dispensing element to dispense ice when activated, and an activation element for activating the dispensation when any movement or heat is detected within a predetermined distance from the apparatus, or when a pressure switch is contacted. The number of times that ice is dispensed is no more than three times within a half hour. Ice may be made by the apparatus or deposited within an insulated compartment of the apparatus.

20 Claims, 11 Drawing Sheets

ICE DISPENSING APPARATUS FOR ANIMALS

FIELD OF THE INVENTION

This invention relates to an apparatus for pets and more particularly to an apparatus to dispense ice to pets.

BACKGROUND OF THE INVENTION

Food and water dispensers for pets have been known for a while. Also, ice making and ice dispensing machines have been known. However, there is a need for an apparatus to dispense ice to pets.

The needs for such an apparatus are many. The apparatus is particularly needed for dogs. Dog trainers are often seeking new ways to reward their charges for good behavior. Puppies go through a painful teething stage. Owners often want dogs to entertain themselves while the owner is otherwise occupied or absent.

Known feed dispensing machines are unsuitable. These machines are unable to dispense ice. In addition, they are unable to be easily actuated by most dogs.

Portable ice machines are also unsuitable. These machines are not able to be actuated by a dog. Furthermore, the machines are too easily moved by large dogs.

Ice dispensing machines are similarly unsuitable. These are frequently too large and bulky, and also not easily operated by most dogs. Machines that are triggered automatically at preset time intervals are unable to dispense ice only when the pet is near and thus run out of ice when ice is needed.

What is needed is an apparatus able to dispense ice when a pet is near even when a person is not present to operate the apparatus. Preferably the apparatus is neither cumbersome nor easily moved by a pet.

SUMMARY OF THE INVENTION

We have invented an apparatus to dispense ice to pets comprising an ice compartment, a means for dispensing ice when a pet is near, and an activation means is triggered. The activation means is triggered when heat or motion is detected within a predetermined distance from the apparatus or when a pressure switch is touched. The activation means is not able to activate more than three times within any half hour time period. The dispensing means may be actuated by heat, motion or pressure.

Another embodiment of our invention is a method for providing ice to pets. This method comprises providing an apparatus, providing ice, and dispensing ice when a pet is within a predetermined distance from the apparatus.

The invention provides several benefits to pets, particularly when pets are dogs. Trainers can use the invention to provide crunchable low calorie treats to pets when good behavior is performed. Pets that are teething can be comforted by retrieving ice to chew on to sooth sore gums. In addition, pets seeking pleasurable distractions while owners are absent or otherwise occupied may retrieve ice as a toy with our invention. More over, ice used by pets leaves little if any residue.

BRIEF DESCRIPTION OF THE DRAWINGS

One or more features or preferred forms of the invention are described in the accompanying drawings. The drawings are briefly described below.

DETAILED DESCRIPTION OF SOME EMBODIMENTS OF THE INVENTION

Figure 1:
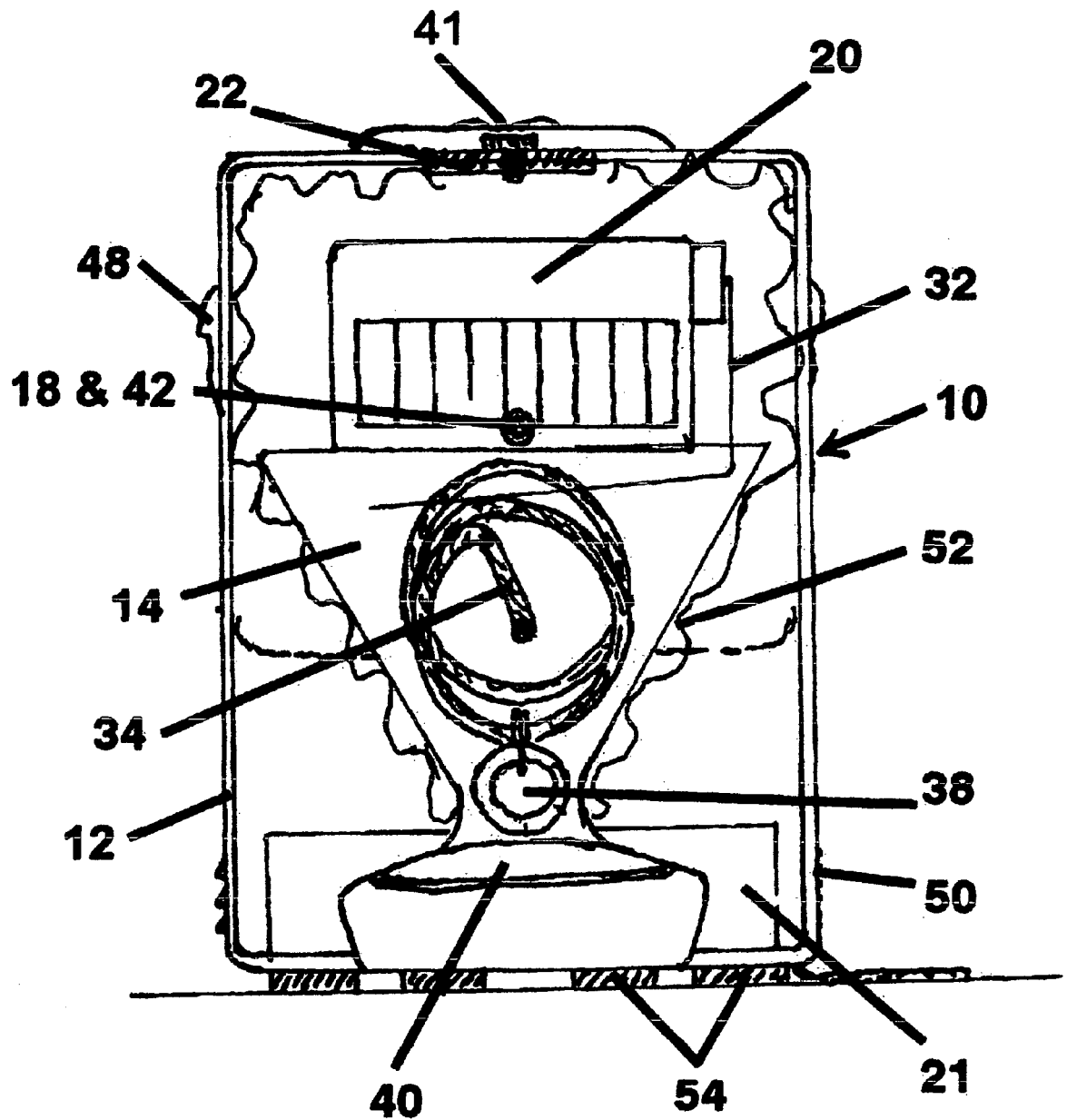
FIG. 1 is a front view of an embodiment of the apparatus containing means for making ice and a freezer unit.

Ice in bit size pieces is a desirable distraction for many types of mammal pets and particularly for dogs. Chewing on the ice provides exercise. In addition, dogs seem to enjoy playing with ice as it moves in often unexpected ways. Ice can also have a soothing effect on dogs that are teething. In addition, ice has no harmful nutritional aspects and leaves little if any residue to be cleaned up later by an owner. Thus there is a need for an apparatus that can deliver ice to such animals, particularly when owners are not present.

Many devices are known that exhibit parts of the invention. Devices are known for delivering food and water to animals while an owner is absent. Devices, some portable, are also known to make ice. Other devices are known to dispense ice and some both make and dispense it. However, none have put the parts together or given any suggestion for such a combination to make an apparatus to dispense ice to pets, particularly dogs. The known devices lack a dispensing means that is triggerable by the pet.

Such an apparatus has unique needs to be so activated. It should be able to deliver ice when the pet is near. Optionally, the apparatus is durable for use by pets of a variety of sizes and activity levels. Also, some embodiments of the apparatus are resistant to adverse movement by the pet. Adverse movements of the apparatus include such events as, for example, the tipping over of the apparatus onto its side or the knocking of it against breakable furniture such as tables with lamps. Other, optional characteristics beneficial for use by pets include a means to adjust the number of times ice could be dispensed over a period of time. These are not aspects generally thought to be needed for human use and would be considered undesirable by many.

In general, the aspect of our invention that is the manufactured object comprises a support structure, a compartment for holding ice, a means for dispensing the ice, and a means for triggering the dispensing of the ice by a typical pet.

The structure has a primary function and at least one optional function. The primary function of the structure is to hold the other elements of the invention together in one embodiment. As such, the structure may be made of any conventional construction material such as, for example, wood, metal or plastic and may be made of elements of a variety of forms such as, for example, sheets, rods, bars or tubes. The structure may be in a unified construction of one member or a collection of members assembled by known techniques, such as, for example, with screws and nuts, nails, mechanical fasteners, or adhesives.

In some embodiments of the invention, the structure may further comprise a housing to encompass at least some of the other elements of the invention. One advantage of the housing is to minimize possibility of intrusion by the pet into some of the elements such as the compartment that holds the ice, the ice dispensing apparatus or the optional ice-making apparatus. This may enhance safety to some pets and may minimize adverse damage to the apparatus of the invention. The housing may be made of a variety of materials typically used as housings. These include, plastic, metal and wood. For some embodiments, the housing is durable and light weight.

An optional function of the structure is to minimize adverse movement of the apparatus by a pet as discussed above. Some embodiments have structures able to be mounded to a fixed place such as a wall or floor. Other embodiments are inherently heavy or are attached to heavy fixtures such as plates of metal. Still other embodiments have protrusions extending outward in a somewhat horizontal manner, such as, for example, devices ranging from stationary rods to a serving tray.

Another optional function is portability. Some portable embodiments have a base with a footprint of less than about 2.5 square feet (about 5800 square centimeters). Others have a footprint less than about 2 square feet (about 4000 square centimeters). Still others have a footprint less than about one square foot (about 1000 square centimeters). Some portable embodiments have a weight without water or ice of less than about 20 pounds (about 9 kilograms). Others have a weight less than about 10 pounds (about 4.5 kilograms).

The compartment for holding ice is attached to the structure. Any container able to hold ice and able to resist or slow the melting of the ice is suitable. The compartment has an input end and an output end. Ice may be inserted into the compartment through the input end and is able to be conveyed from the compartment through the output end that is in communication with a dispensing means. The walls of the compartment of some embodiments of the invention are typically resistant to the transfer of heat or cold and are made of non-toxic materials known for such properties to prolong the time that the ice remains frozen. Such materials include, for example, closed cellular foams such as Styrofoam. The compartment of other embodiments is a freezing unit similar to those used in small, commercially-available, freezers. Embodiments comprising freezing units typically need a source of power.

Alternatively, the apparatus may also comprise an ice-making apparatus that is also attached to the structure in a manner that allows ice to exit the ice-making apparatus and either enter the input end of the compartment or be contained, at least in part, within the compartment. Ice-making devices, particularly small devices suitable for a portable apparatus, are well known to the public. When an ice-making apparatus is included, electricity and a source of water are also needed. These requirements may limit portability of some embodiments of the apparatus to locations having power outlets and water sources. Other embodiments may also have self-contained sources of electricity such as, for example, suitably sized battery packs and a water container in communication with the ice-making apparatus to provide water to the apparatus during its operation. Some embodiments have an ice-making apparatus able to make ice in small relatively uniform pieces. Other embodiments have additional devices in communication with the ice-making apparatus for reducing large pieces of ice to smaller ones suitable for delivery into the dispensing means.

In embodiments where the ice-making apparatus is present, some embodiments have output ends of the above compartment equipped with exit doors and dispensing means that end short of the door. In these embodiments, ice is allowed to push through the door as it leaves contact with the dispensing means and fall into reach of a pet. Other embodiments have a means to place the apparatus on standby when a predetermined amount of ice is made. Such methods are well known to the public. These embodiments typically provide ice to pets as the ice is being made. Embodiments equipped in this manner may have a means of signaling a pet when ice is available, such as, for example, by means of a light or audio sound.

In embodiments using electricity, care is preferably taken to minimize danger to a pet. Since water is conductive, electric current should be at a threshold below the limit where harmful shocks are likely if a short were to occur. This can be accomplished by limiting amperage to a low level to permit use of household voltages. Some embodiments are below 1 amp. Some embodiments are below 0.1 amps. Other embodiments are below 0.001 amps. Still other embodiments may use ground fault technology known to the public.

The output end of the compartment is attached to a dispensing means for conveying the ice from the compartment to another place, such as a receiving container such as, for example, a serving tray. The dispensing means is typically motorized but may be non-motorized. Non-motorized means are known and are typically operated through use of gears, levers, springs and conveying compartments. Known motorized dispensing means include, for example, conveyer belts, with or without compartments and at least one screw-like shaft fitted to a shaped-to-conform passage. In some embodiments that include an ice-maker and a dispensing means devise that ends at an access door, the dispensing means may also include gravity that conveys ice to a receiving container accessible to a pet. Motorized means generally require a source of power.

The means for triggering the dispensing of the ice by a pet is attached to the structure and in communication with the dispensing means. The triggering means may also be in communication with the output end of the compartment to minimize excessive amounts of ice collecting on the dispensing means. Various means may be used. All of them are actuated by either active or passive action by a pet. Some means are motion detectors or heat detectors that send a signal to the dispenser to release ice when motion or heat is detected. Such a detector in some embodiments is actuated by motion or heat within about 10 feet (about 3 meters). Activation in others occurs within about 5 feet (about 1.5 meters). Activation in others occurs within about 2 feet (about 0.6 meters) to less than 6 inches (about 12 centimeters). Motion and heat detectors are well known in the art of security monitoring. Typically they are powered by a source such as, for example, electricity from a battery or external source of electrical current. Also, these means are optionally able to be turned off or adjusted to avoid activation when human traffic is anticipated, particularly heavy human traffic, or when an owner does not desire the apparatus to provide ice.

Another means of triggering is by a mechanical-lever arrangement or pressure-sensitive region in communication with the dispensing means. The trigger is actuated when a pet presses the lever or pressure-sensitive region in some manner, such as with a paw or nose. Mechanical-levers and pressure-sensing devices are well known for use with devices actuated by humans. The former typically can be operated without power while the latter typically require some source of external power such as, for example, a battery or external source of electricity. Both may be deactivated by various known means, such as for example, a locking pin or a hard cap over the pressure-sensitive touch pad.

Electronic displays, such as LCD displays or LED displays may be used by some embodiments to select the operating modes that are desired. Selections may include various triggering means, numbers of activation over a selected time period, amount dispensed at each activation, and total activation times available to a pet.

In some embodiments, the triggering device incorporates a means of limiting the amount of times that the triggering device is actuated over a period of time. In this manner, ice would be released, for example, two or three times every half hour regardless of how many times the triggering device is actuated. This may be beneficial to keep the interest of the pet through intermittent reinforcement and not result in an excess of ice melting after being dispensed. Similarly, the amount of ice dispensed at each time of activation may be adjusted to provide variety to maintain the interest of a pet and also possibly reduce the amount of excess ice melting after being dispensed.

Electronic displays, such as LCD or LED displays may be used by some embodiments to select operating mode desired. Selections may include various triggering means, numbers of activation over a selected time period, amount dispensed at each activation, and total activation times available to a pet.

Some embodiments may also include a receptacle such as, for example, a serving tray below the output end of the dispensing means for receiving dispensed ice. This minimizes the presence of water from melted ice in one or more puddles around the house when the apparatus is used indoors. It also is a source of water for a pet when ice is allowed to melt before use by the pet. A receptacle may be any useful shape and include an open ended container such as, for example, a tray with raised edges or a bowl. The receptacle may be attachable to the support structure or may be free-standing. In some embodiments an opening is made available in the apparatus of the invention for the inclusion of the receptacle. When a receptacle is not used, the opening is useful for allowing the pet to reach the ice that is dispensed.

Figure 2:
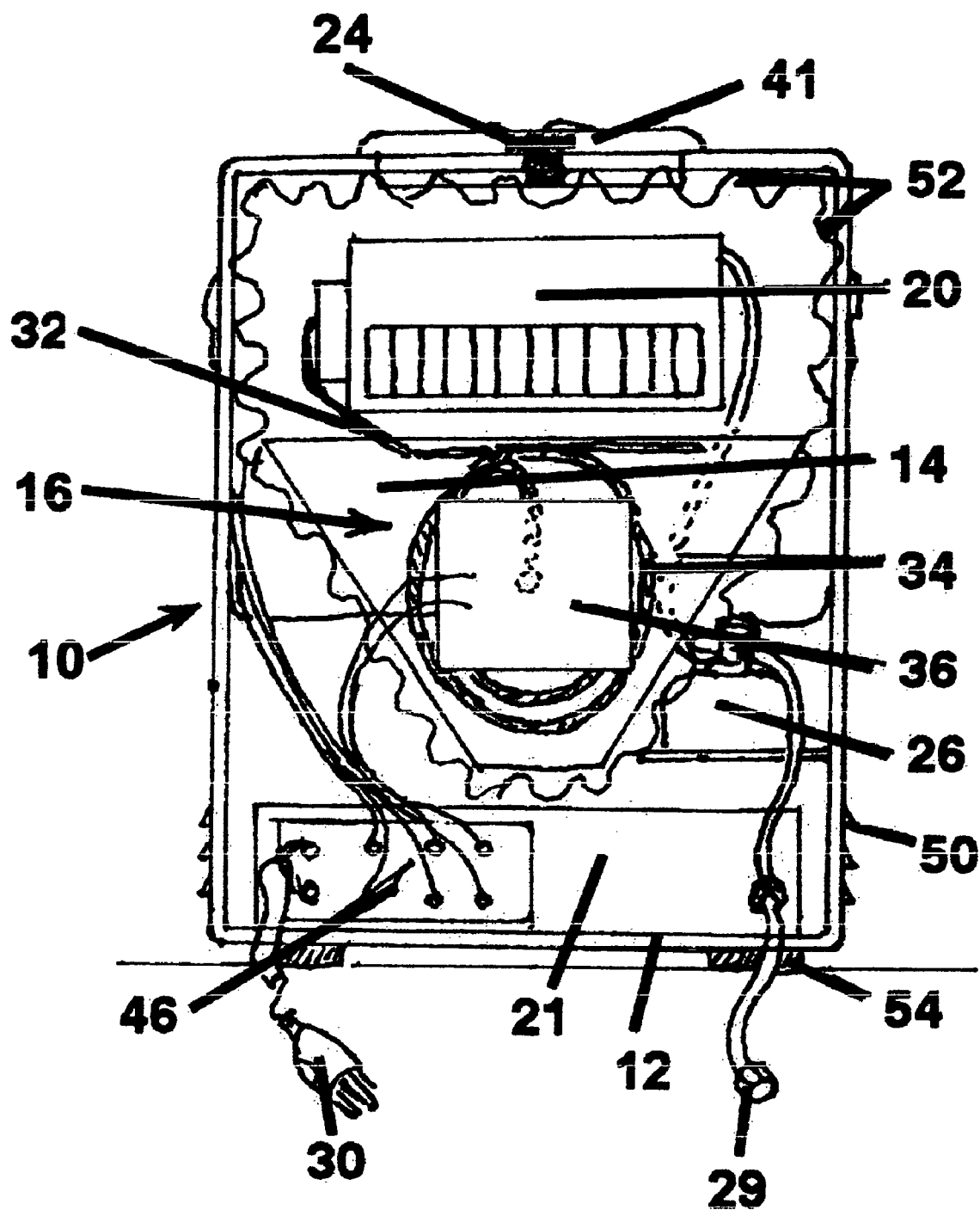
FIG. 2 is a back view of the embodiment of the apparatus shown in FIG. 1.
Figure 3:
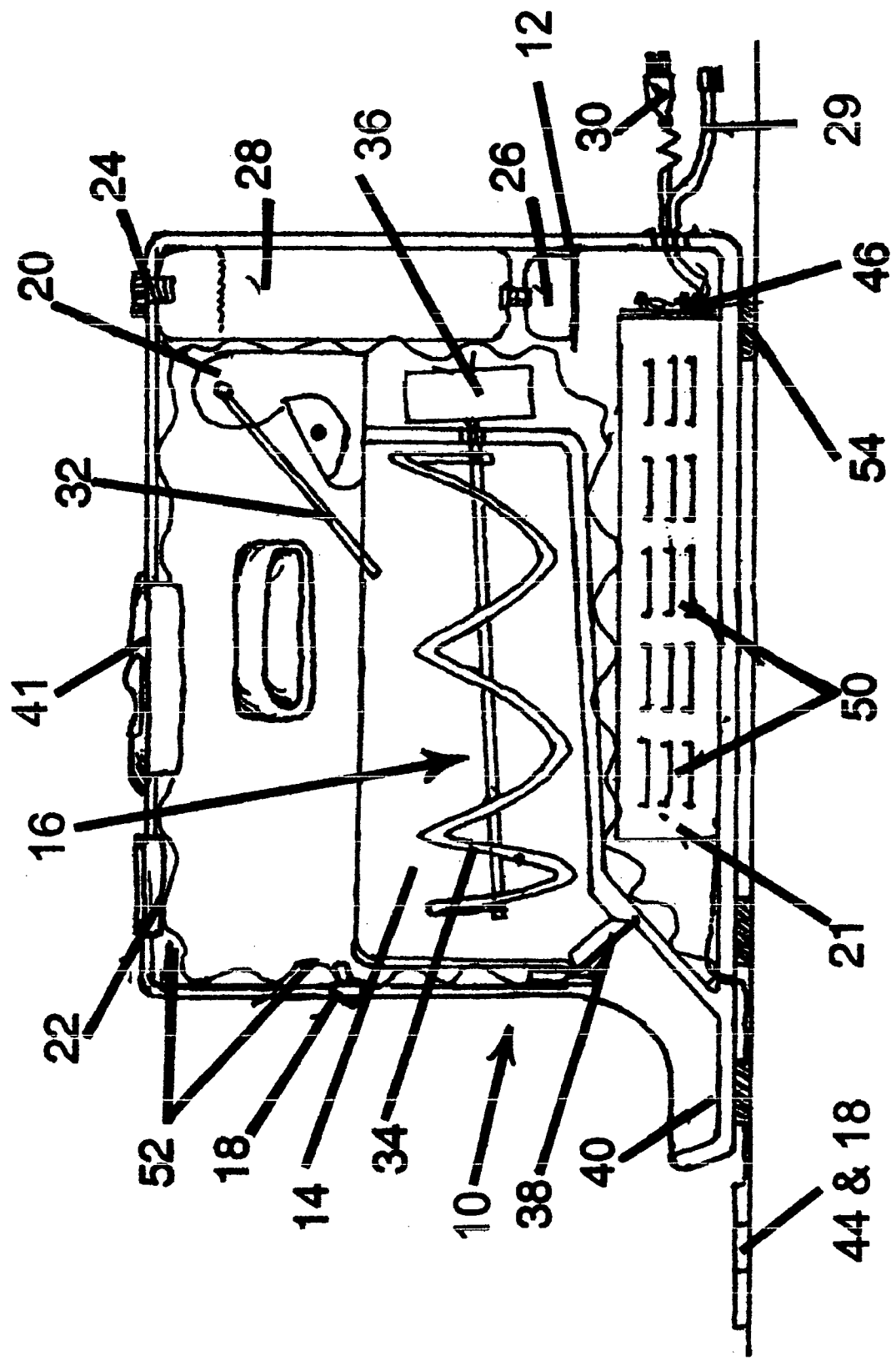
FIG. 3 is a side view of the embodiment of the apparatus shown in FIG. 1.
Figure 4:
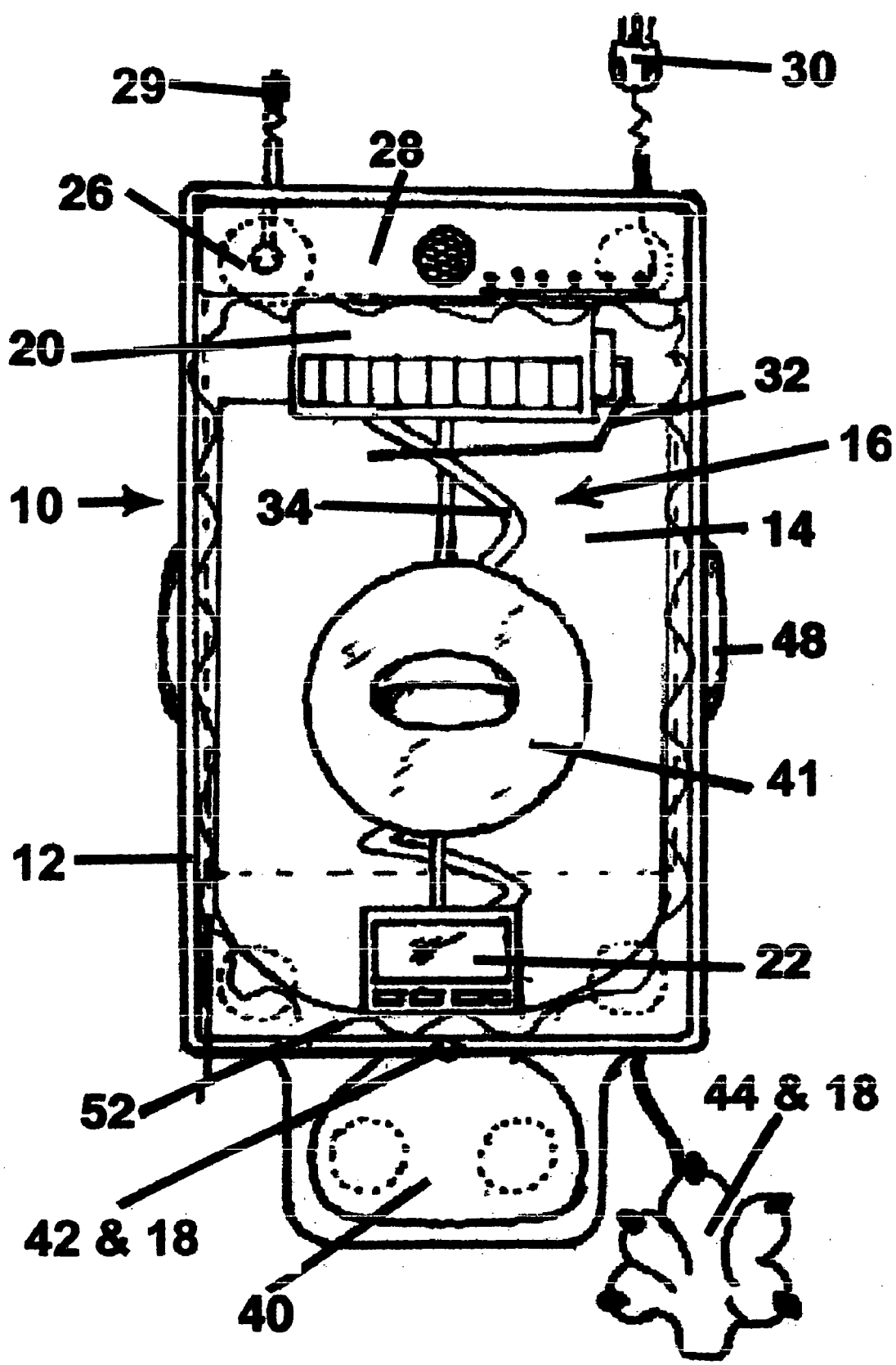
FIG. 4 is a top view of the embodiment of the apparatus shown in FIG. 1.

An embodiment is illustrated in FIGS. 1-4. For ease of understanding, each element has the same number in all figures. FIG. 1 is a front view of apparatus (10) and FIGS. 2-4 is a back view, a side view and a top view, respectively. Apparatus 10 is shown with a support structure (12), a compartment for holding ice (14), a means for dispensing of the ice (16), and a means for triggering by a pet the dispensing of the ice (18). In addition, apparatus 10 has a means of making ice (20), a freezer unit (21) for prolonging time ice remains in ice state and an LCD controller (22) as a means for controlling the components including selection of an operating mode.

To supply water for ice-making means 20, a water fill cap (24), a water control valve (26) and a water tank (28) are provided. Cap 24 is removed and a hose (not shown) can be attached to valve 26 to permit easier filling of water tank 28. Alternatively, water can be introduced through a water source hose (29) attached to an external source of water (not shown). An electrical plug (30) allows for electrical current from an external source to power ice-making means 20 and other electrically-powered devices. An ice sensing switch (32) is provided to turn off the icemaker when dispensing means 16 is full of ice. Pressure of excessive ice causes the horizontal bar of the sensor to move upward, thus shutting off ice maker 20.

Dispensing means 16 is an ice auger (34) powered by an electrical motor (36). The dispensing means is able to advance ice (not shown) along the base of ice holding compartment 14 from ice-making means 20 through an ice compartment exit door (38) to a serving tray receiving container (40). An ice compartment access cover (41) is also shown to permit external input of ice instead of use of the ice-making means 20. When ice is supplied in ice holding container 14, ice-sensing switch 32 is inactivated through controller 22.

Apparatus 10 uses two means for triggering the dispensing means by a pet 18. A motion sensor (42) and a touch pad (44). The desired mode of operation can be selected with use of controller 22. An electrical distribution board (46) distributes electricity to various electrically operated devices including controller 22.

Structure support 12 also has additional embellishments. Two handles (48) are provided to make the movement of the apparatus easier. Also provided are air circulation fins (50) that are used to cool some of the electrical devices and insulation (52) to lessen the rate the ice-melting before a pet has an opportunity to use apparatus 10. In addition, the bottom of apparatus 10 has rubber feet (54) to minimize movement of the apparatus by a pet by increasing traction to a surface.

Figure 5:
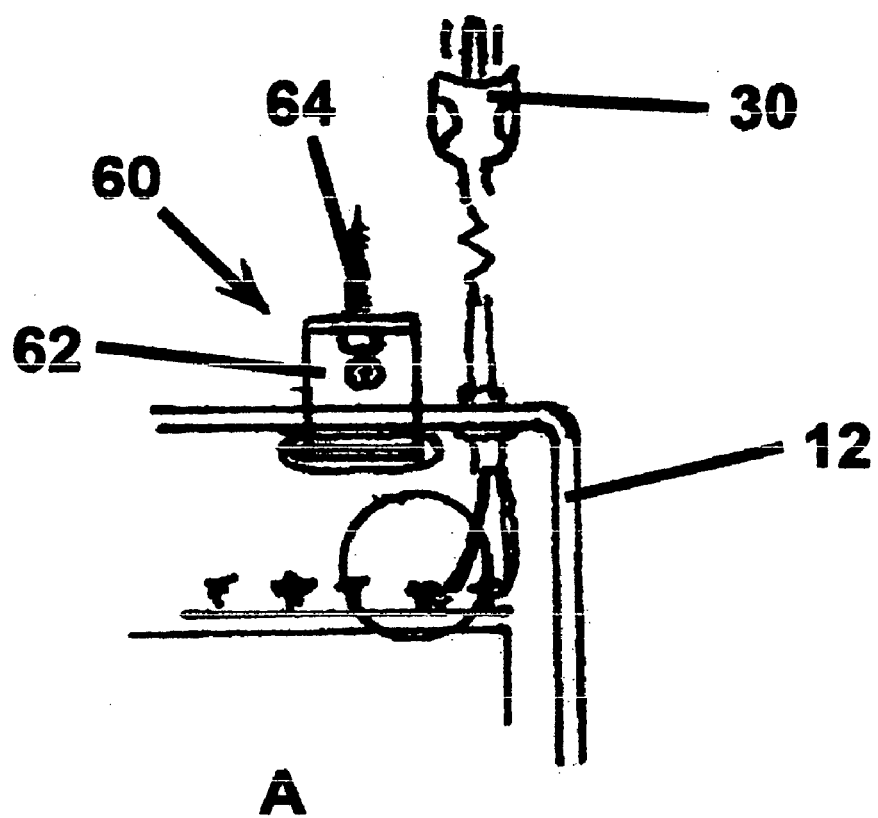
FIG. 5 is a top view (A) and side view (B) of a mounting arrangement of the embodiment of the apparatus shown in FIG. 1.
Figure 5:
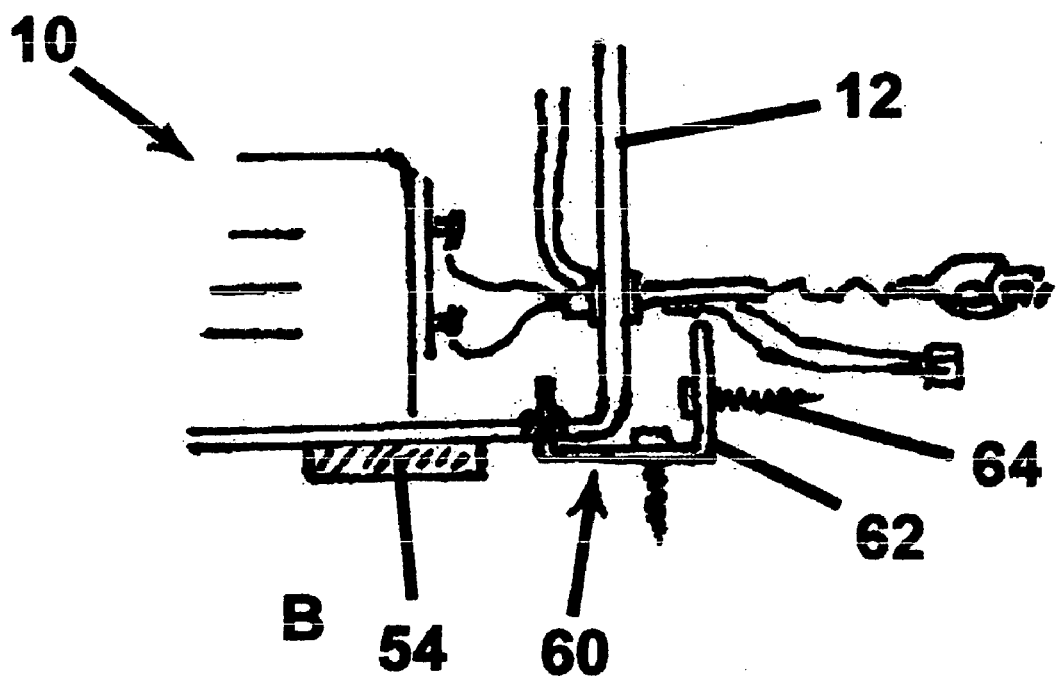

FIGS. 5A and 5B are top and side views of an embodiment of a fastener arrangement (60) for affixing an apparatus (10) to another structure such as a wall. The fastener depicted is a bracket (62) fastened with screws (64) to a rear bottom of structure support 12 of apparatus 10 and another structure such a wall (not shown).

Figure 6:
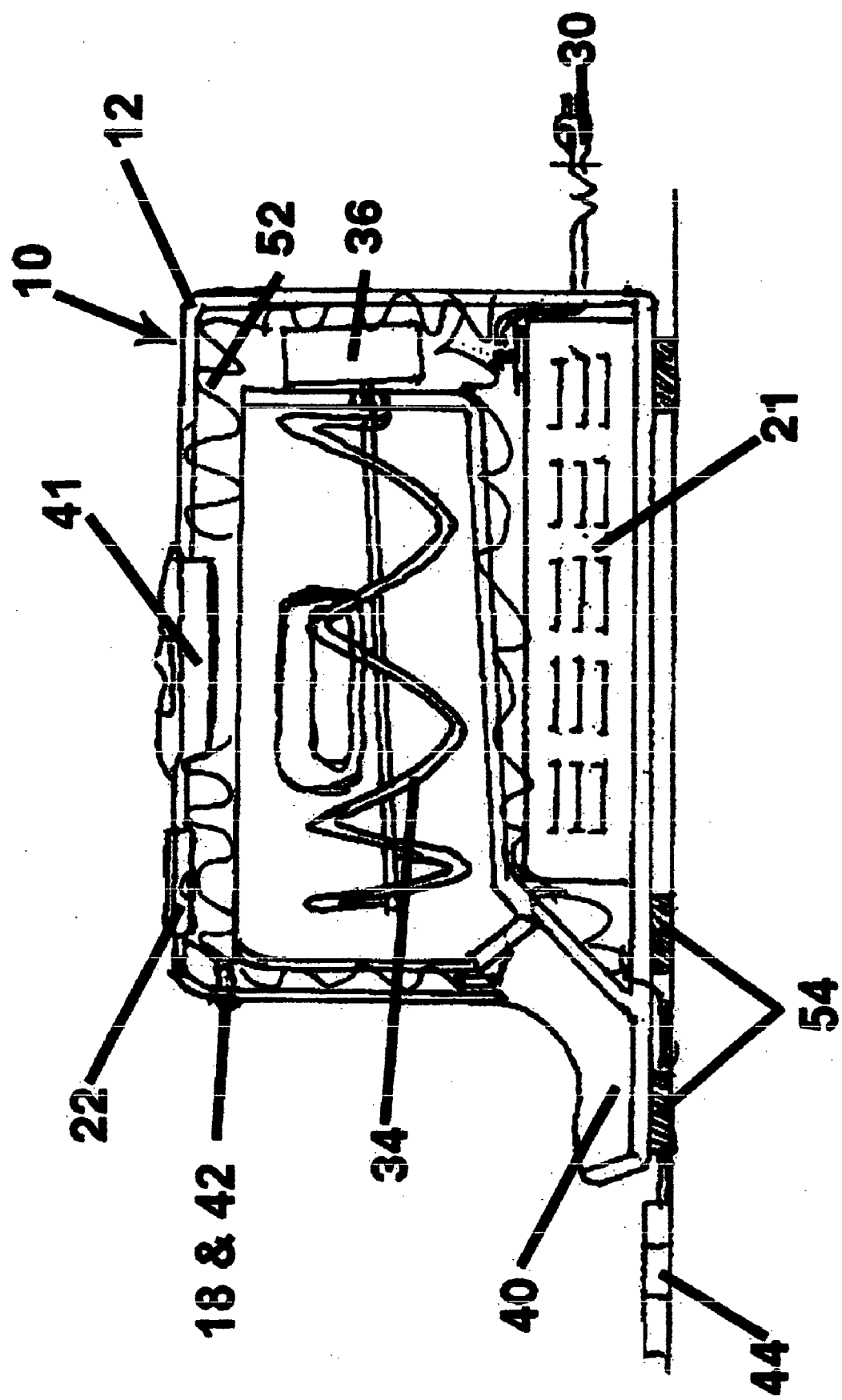
FIG. 6 is side view of an embodiment containing a freezer unit.
Figure 7:
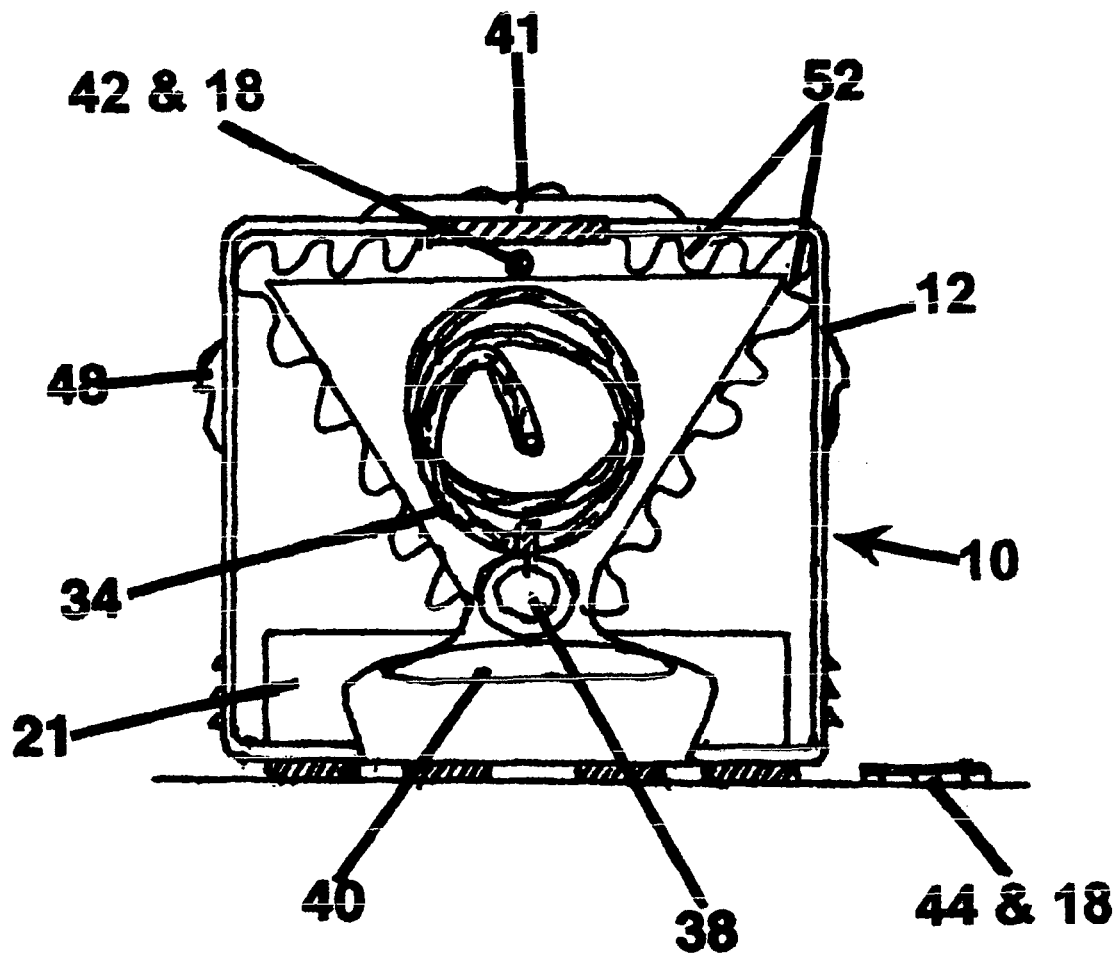
FIG. 7 is a front view of the embodiment of the apparatus shown in FIG. 6.
Figure 8:
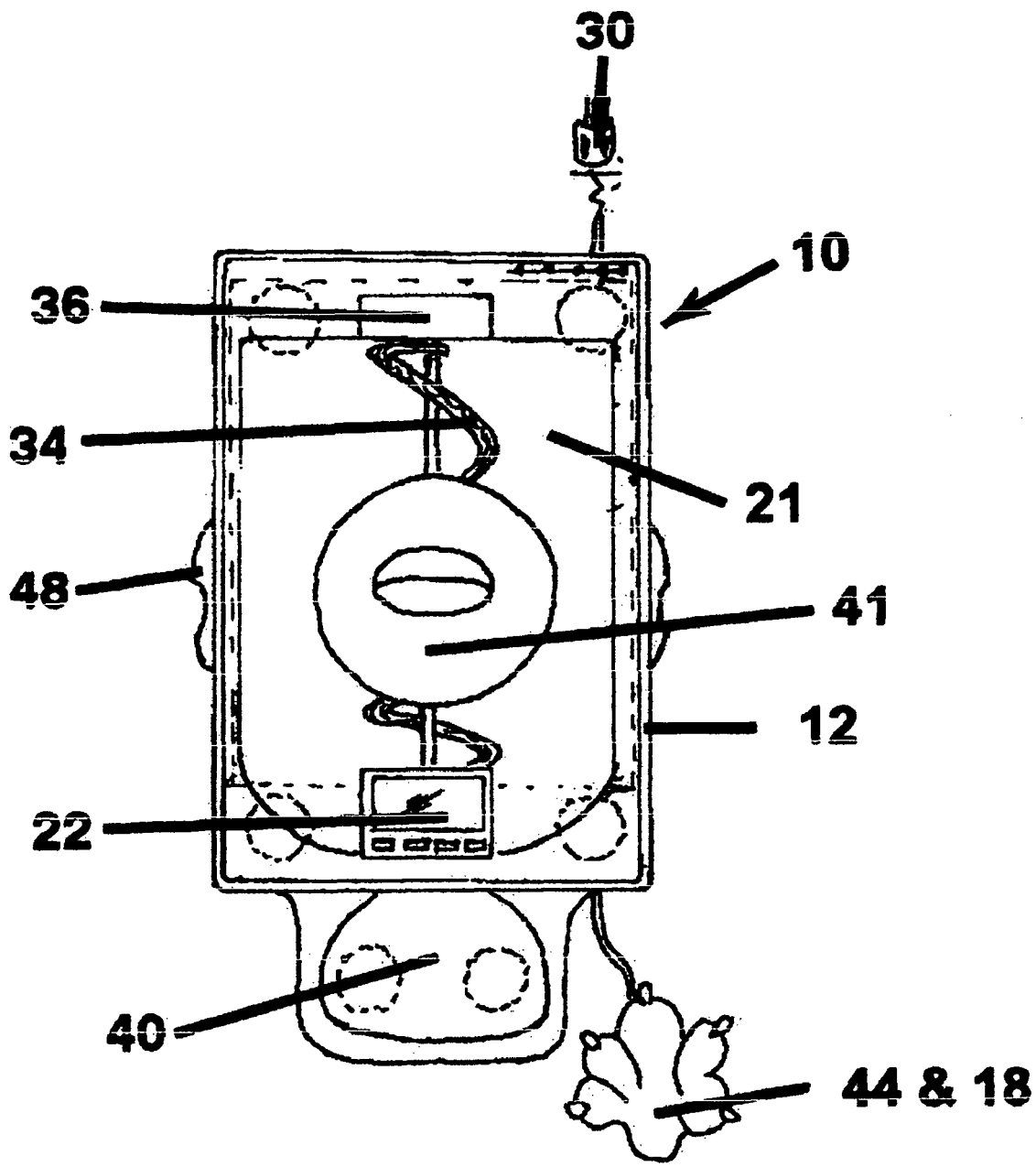
FIG. 8 is a top view of the embodiment of the apparatus shown in FIG. 6.

FIGS. 6-8 illustrate various views of an embodiment of apparatus 10 containing freezer unit 21 but not means for making ice 20. Ice is introduces into compartment for holding ice 14 through ice compartment access cover 41.

Figure 9:
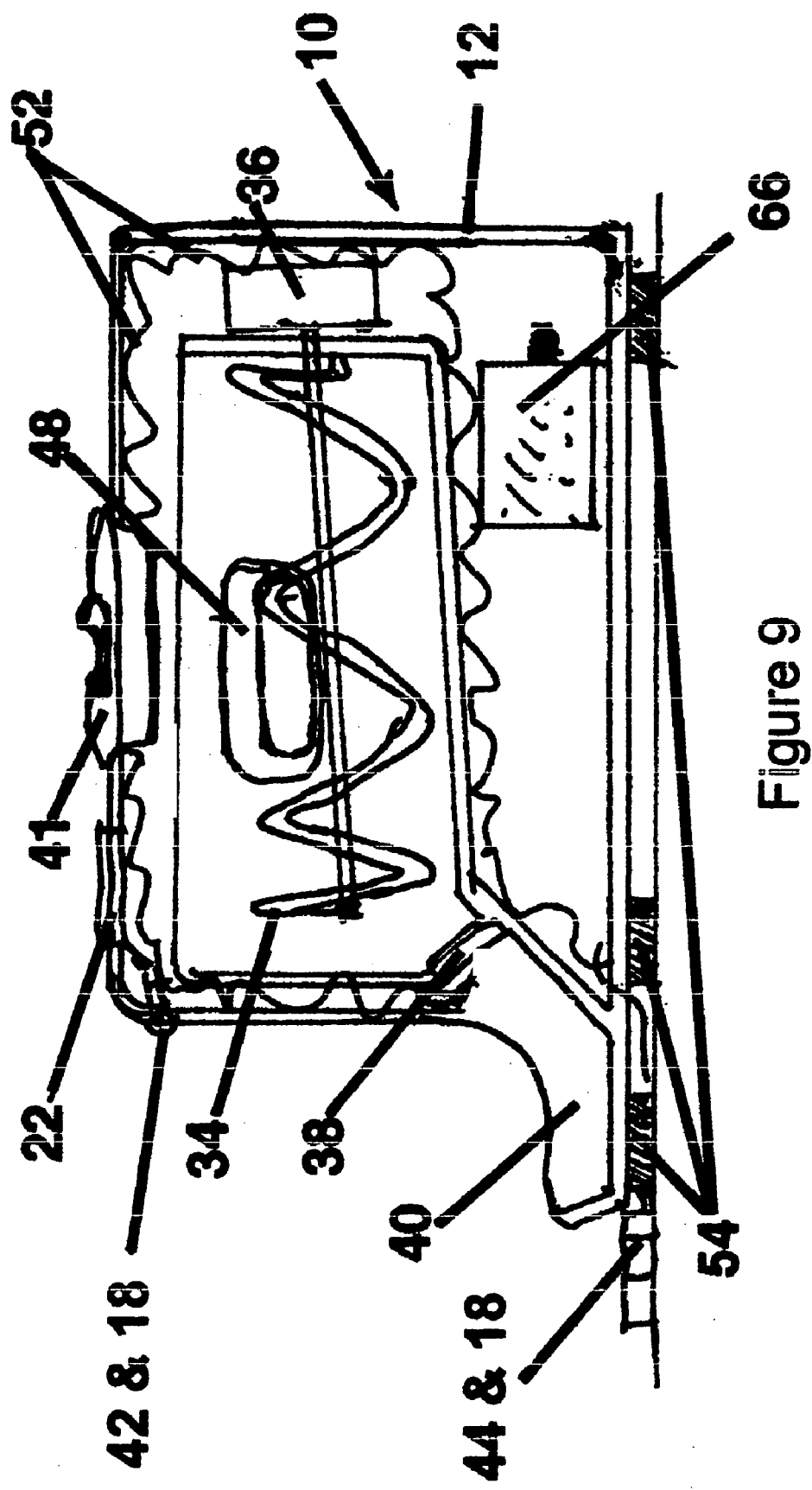
FIG. 9 is side view of an embodiment containing a battery unit.
Figure 10:
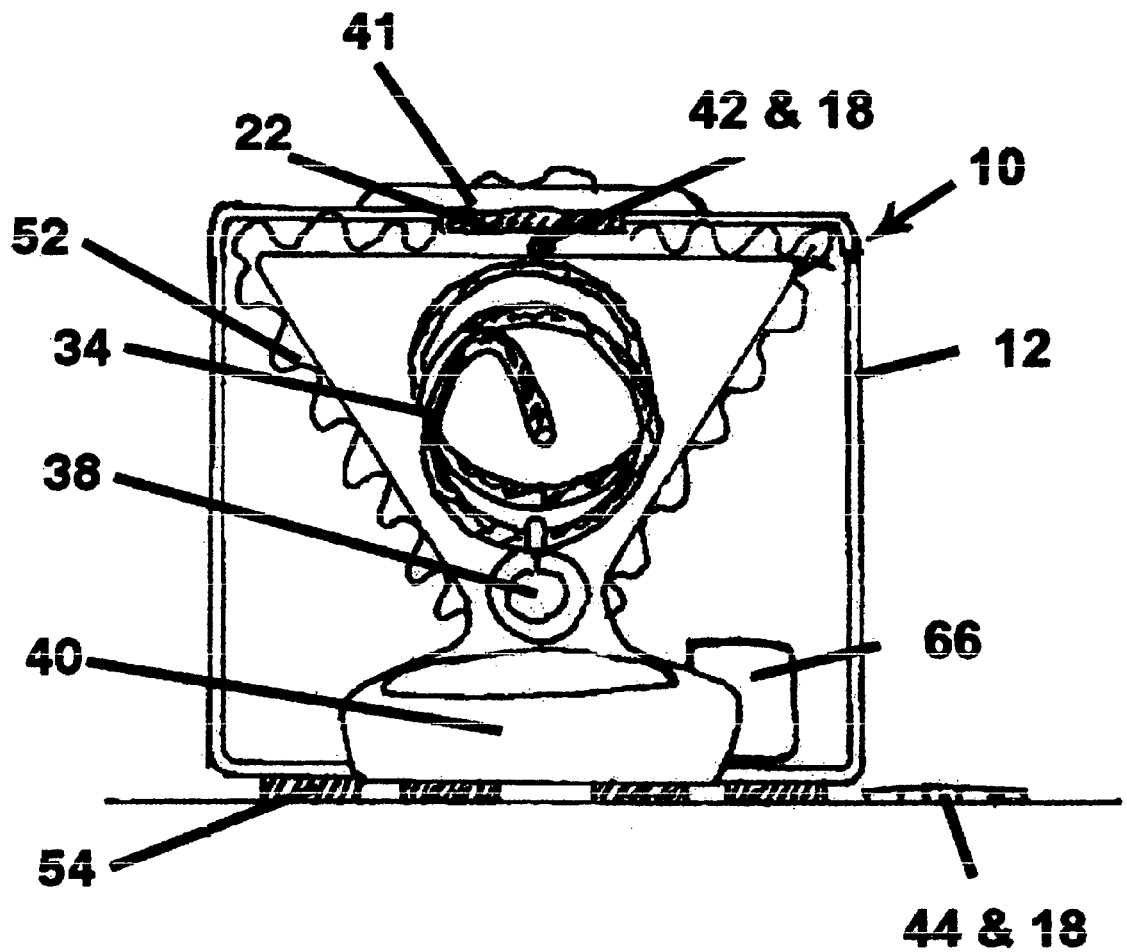
FIG. 10 is a front view of the embodiment of the apparatus shown in FIG. 9.
Figure 11:
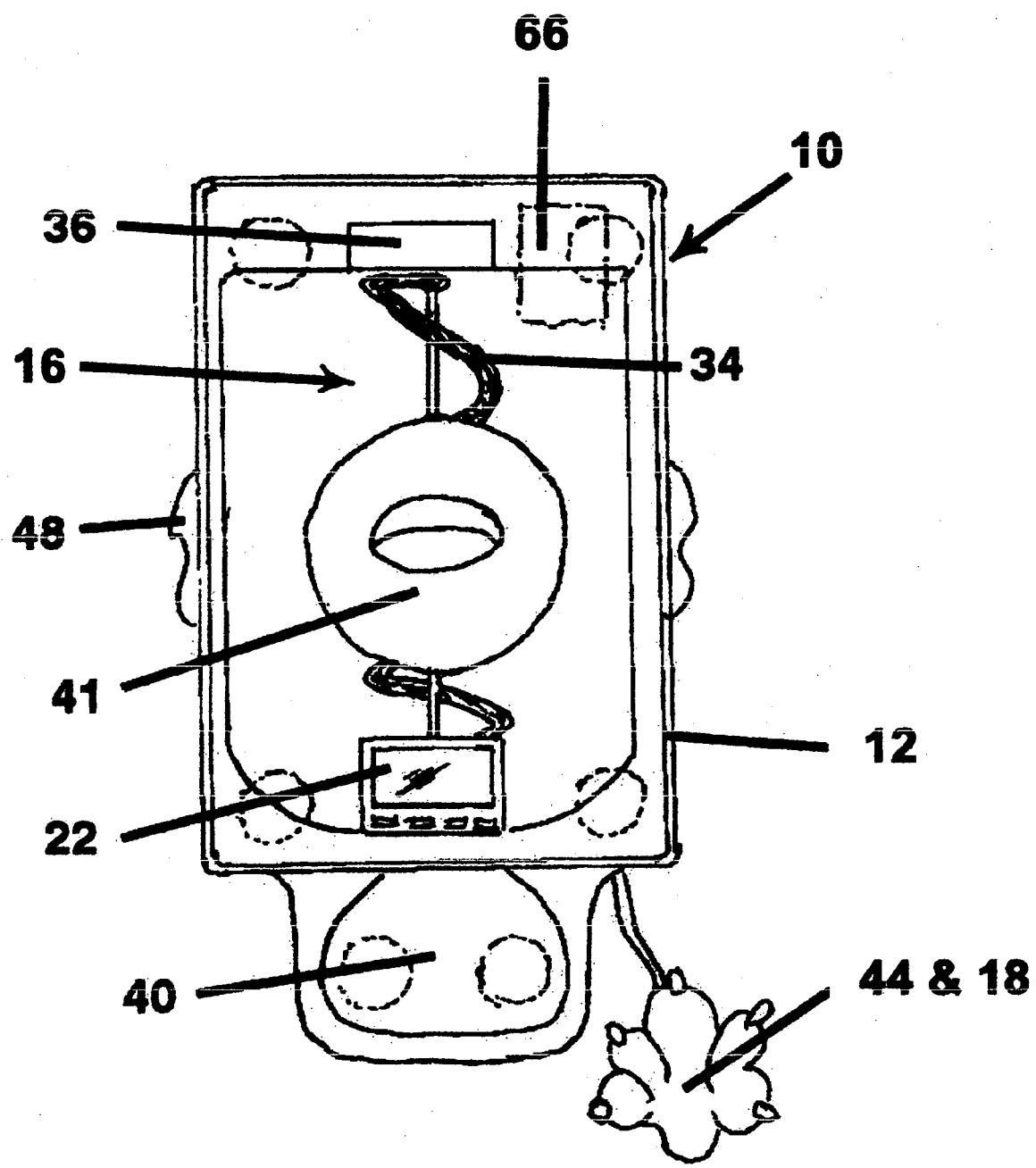
FIG. 11 is a top view of the embodiment of the apparatus shown in FIG. 9.

FIGS. 9-11 illustrate various views of an embodiment of apparatus 10 containing a battery unit (66) and no means for making ice 20 or freezer unit 21. This embodiment is capable of being lightest in weight and most portable of those embodiments illustrated in the figures.

The invention also includes a method of dispensing ice to a pet. This method comprises providing an apparatus able to dispense ice, delivering ice to the apparatus, and triggering the apparatus to deliver ice to a pet. The method may be used to deliver ice over predetermined intervals of time or when the pet is proximate the apparatus. Preferably the method is used in the latter situation to increase the likelihood of ice being available when the pet wants to interact with it.

The apparatus comprises a support structure, a compartment for holding ice, a means for dispensing the ice, and a means for triggering the dispensing of the ice. The support structure and means for dispensing the ice are as described above. The means for triggering the dispensing can be either by proximity of a pet as described above or by some automatic means that is independent of the presence of the pet.

Optionally, an ice-making apparatus may be included that is attached to the support structure. In such embodiments, a source of water is in communication with the ice-making apparatus. In addition, the method further comprises the steps of making ice and delivering ice from the ice-making apparatus to the compartment. The ice-making apparatus is as described above. Preferably, the ice is made in the form of small pieces to make subsequent delivery of the ice to the compartment and dispensing of the ice from the compartment easier.

As mentioned above, the optional ice-making apparatus, the container for the ice, the dispensing means and the triggering means are all known in different combinations other than that of our invention. Thus manufacturing the components are by means already known.

With this teaching, other modifications and changes varied to fit the need of delivering ice to pets will be apparent to those skilled in the art. The invention is not considered limited to the example chosen for purposes of disclosure and covers all changes and modifications which do not constitute departures from the true spirit and scope of this invention.

We claim:

1. An apparatus for dispensing ice in an entertaining manner to a recipient comprising,
    a support structure;
    a compartment attached to the support structure wherein the compartment has an input and an output and is able to hold ice;
    a means for dispensing the ice having an input and an output wherein the input of the dispensing means is in communication with the compartment output;
    an electronically programmable means for actuating the dispensing means that is from a group consisting of a motion detector, a heat detector, and a pressure switch; and
    an electronically programmable means of deactivating actuation of the dispensing means and having no configurations able to be set by the ice recipient and having a configuration that restricts a number of actuations of the dispensing means to between one and three within each successive half hour period of time and deactivates the dispensing means for any balance of the half hour period of time,
    wherein the means for actuating the dispensing means is in electronic communication with the means of deactivating actuation and the dispensing means.

2. The apparatus of claim 1 wherein the support structure is able to be generally fixed in a particular location.

3. The apparatus of claim 1 wherein the compartment has sides made of an insulating material comprising closed cell foam.

4. The apparatus of claim 1, further comprising, an ice making apparatus attached to the structure and able to deposit ice in the ice compartment.

5. The apparatus of claim 1 wherein the means for actuating the dispensing means is from a group consisting of a motion detector and a heat detector, and the motion detector and heat detector have a range of less than ten feet from the apparatus.

6. The apparatus of claim 5 wherein the range from the apparatus is less than five feet.

7. The apparatus of claim 5 wherein the range from the apparatus is less than two feet.

8. The apparatus of claim 1 wherein the means of deactivating actuation further comprises a configuration to permit a different number of actuations over successive half hour periods of time to make actuation seem less predictable and more interesting to the recipient.

9. The apparatus of claim 1 wherein the means of deactivating actuation further comprises a configuration to permit the quantity of ice dispensed to vary over time, wherein different amounts of ice are able to be dispensed at different times of dispensing to increase interest in the recipient.

10. The apparatus of claim 1, further comprising, a means for making the apparatus resistant to undesirable movement by the recipient.

11. The apparatus of claim 1 wherein the means for dispensing is powered by electricity of sufficiently low current to cause minimal harm to the recipient upon an occurrence of a short.

12. The apparatus of claim 1 wherein the means for dispensing is powered by household power.

13. The apparatus of claim 1 wherein the means for dispensing is powered by mechanical power.

14. The apparatus of claim 1 wherein the apparatus has a footprint of less than about 2.5 square feet (about 5800 square centimeters).

15. The apparatus of claim 1 further comprising an ice receiving container positioned proximate the output end of the dispensing means.

16. The apparatus of claim 1 wherein the number of actuations is two or three.

17. An apparatus for dispensing ice to a recipient comprising,
    a support structure,
    a compartment attached to the support structure wherein the compartment has an input and an output and is able to hold ice,
    a means for dispensing the ice having an input and an output wherein the input of the dispensing means is in communication with the compartment output, and
    an electronically programmable means for actuating the dispensing means that is able to be triggered by all motion detected within a predetermined range of not more than ten feet from the apparatus for entertainment of the recipient wherein the actuating means is in communication with the dispensing means.

18. The apparatus of claim 17, further comprising,
    an electronically programmable means of limiting actuation having no configurations able to be set by the ice recipient and having a configuration that permits actuations of between one and three within each half hour period of time of operation of the actuating means wherein the means of limiting actuation is in communication with the means for actuating the dispensing means and the dispensing means.

19. The apparatus of claim 18 wherein the limitation means further is configured to permit a different number of actuations over successive half hour periods of time to make activation seem less predictable and more interesting to the recipient.

20. The apparatus of claim 18 wherein the limitation means further is configured to permit selection of different durations of time for each actuation to permit different amounts of ice to be dispensed at different times of dispensing to increase interest in the recipient.

* * * * *